Aug. 3, 1954

W. G. SCHUTT 2,685,116

MACHINE AND METHOD FOR MOLDING CONCRETE BLOCKS OR OTHER PRODUCTS

Filed Jan. 14, 1948

INVENTOR.
Walter G. Schutt
BY
Barnes, Kisselle, Laughlin & Raisch
ATTORNEYS.

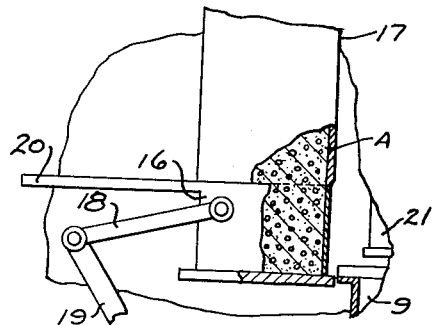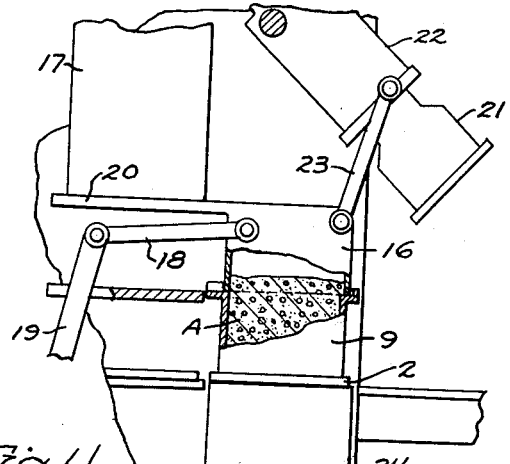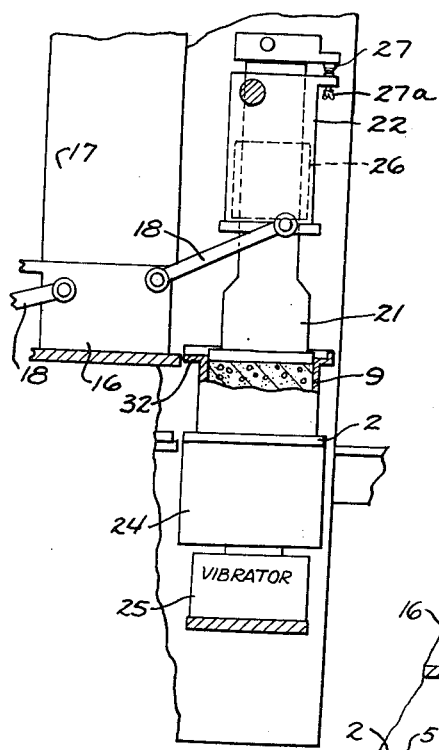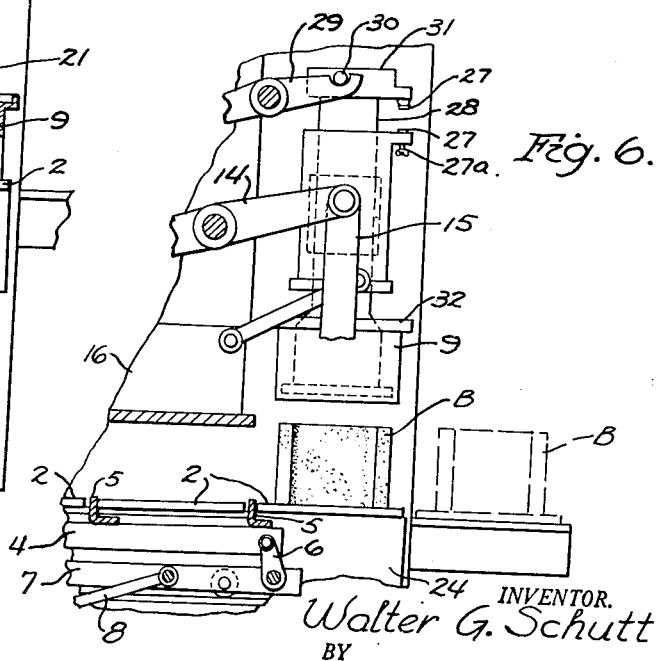

Patented Aug. 3, 1954

2,685,116

UNITED STATES PATENT OFFICE 2,685,116

MACHINE AND METHOD FOR MOLDING CONCRETE BLOCKS OR OTHER PRODUCTS

Walter G. Schutt, Adrian, Mich., assignor to Stearns Manufacturing Company, Adrian, Mich., a corporation of Michigan Application January 14, 1948, Serial No. 2,233

7 Claims. (Cl. 25—41)

This invention relates to concrete block molding machines and the method of making concrete blocks or similar products.

In the commercial concrete block machines it is customary to have the cycle of operations so planned that machine operates continuously and a definite period in one cycle is allotted to each vibration period. The required vibration period may be considerably less than the allotted time and, consequently, a part of the cycle may be wasted thereby slowing up the production. For instance, in most concrete block machines it is customary to vibrate the mold box while the feed drawer is over the mold box spilling its contents into the mold box. It is also customary to vibrate the packer head when this is seated on the contents of the mold box. The amount of vibration given the mold while the feed drawer is dropping its contents into the mold all depends upon the type of aggregate used, the type of unit being made and also upon the amount of packing desired for the contents of the molds before the packing head is lowered onto the mold box. The amount of vibration given the packing head or the mold while the packing head is on the contents of the mold depends upon the size of the block desired. Heretofore, the machines have been designed to allot a sufficient time in the cycle to provide for the maximum time that vibration might take place, consequently, when much less time is used for vibration than the time allotted some seconds of time may be lost when no useful operation is being performed by the machine and, therefore, production is slowed up to this extent.

What I propose to do is to completely stop the machine during either or both vibration periods and stop the machine only the necessary time to go through the required vibration. I allot at each vibration station in the cycle a small portion of the cycle of operation to compensate for inability to always stop the machine at the desired point. In other words, the machine may at times overthrow the point where it is designed to stop and, consequently, a small portion of the cycle at each stop has to be allotted for coasting or overthrow.

I find that this elimination of wasted time in the cycle makes it possible to greatly increase the production per hour. Inasmuch as these concrete machines are expensive it is very important to get maximum production for each machine in order to cut down the cost of the blocks. By my new arrangement I achieve much cheaper blocks both from the standpoint of the cost of the machine and the labor cost of operating the machine.

Inasmuch as these concrete block machines are very complicated in the arrangement of gear wheels, cams, levers, slides and etc., and inasmuch as my improvement consists solely in improving the cycle of operation of the machine, and providing the necessary mechanism to stop and start the machine and the timing for this, it was thought desirable to simplify the drawings as much as possible by making them diagrammatic.

Referring to the drawings:

Fig. 3 is the detailed view showing the feed drawer under the magazine containing the aggregate.

Fig. 4 is a similar view showing the feed drawer over the mold, and the packing head in the lifted and out of the way position.

Fig. 5 shows the feed drawer withdrawn and the packing head resting on the contents of the mold.

Fig. 6 shows the mold box stripped off the blocks and the packing head lifted.

Figure 1:
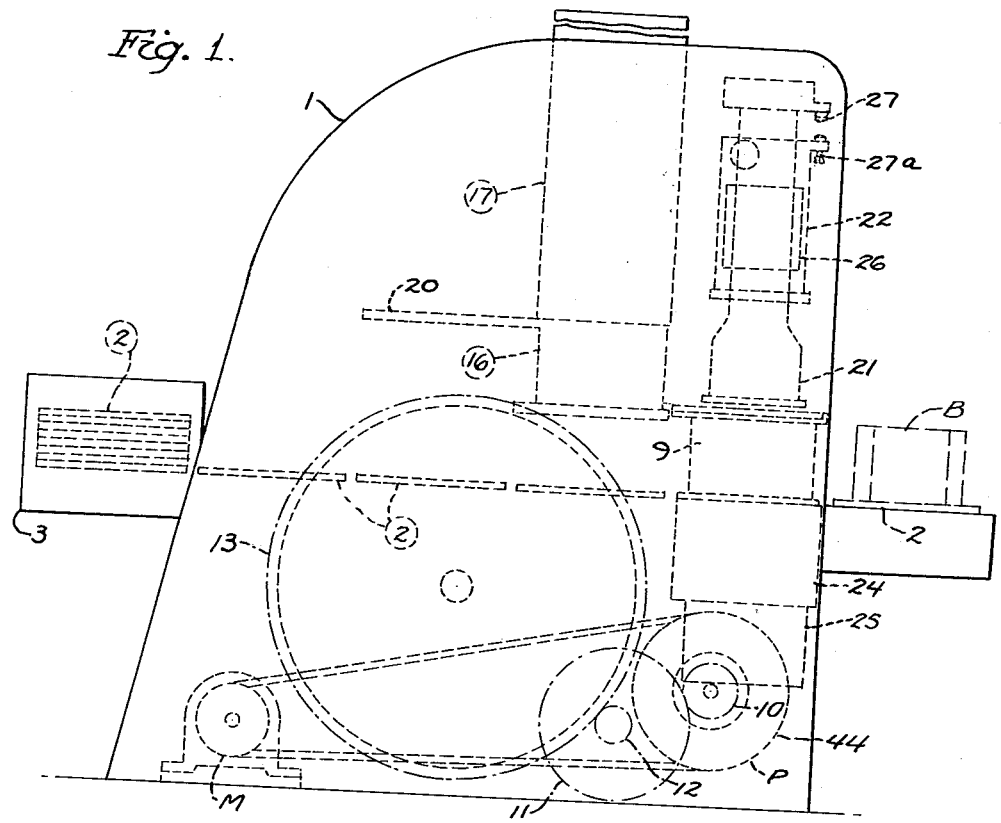
Fig. 1 is a side elevation of the concrete block machine involving my improvement with the important parts shown diagramatically and in dotted lines.

I designates the housing of the machine which is constructed of heavy plates welded or riveted together or it might conceivably be a casting. The pallets 2 are stored in a magazine 3 and are fed forward by a pallet pusher which is not shown in Fig. 1, but which is shown in Fig. 6. This pusher comprises a bar 4 which has a plurality of angle bars 5 which engage behind the pallets and push them forward as shown in Fig. 6. This bar 4 is raised each time the pusher goes forward by means of the crank arm 6 which is attached to the slide 7 which is moved back and forth by arm 8. The crank arm 8 is operated by a mechanism which need not be here shown. The crank 6 will throw the pusher bar 4 up when the slide goes forward and it will drop the pusher bar as the slide draws backward to pick up another set of pallets. It will be seen from this Fig. 6 that every time a pallet 2 is pushed forward under the mold box 9 a pallet carrying a finished concrete block B is pushed out of the machine.

Referring to Fig. 1, M is an electric motor which drives the pulley wheel P, which in turn has a gear 10 attached thereto and drives the reduction gear 11, which in turn operates pinion 12 that meshes with the bull gear 13. This bull gear through connections (not shown) and a large cam wheel (not shown) on the other side of the machine and connections (not shown) serve to give movement to the main instrumentalities of the machine.

One of the operations is moving the pallets forward and this involves feeding simultaneously an empty pallet under the mold box and sliding the pallet of the finished block out of the machine as shown in Figs. 1 and 6. The stripping mechanism comprises the lever arm 14 (Fig. 6) and the slide 15. The feed drawer or the strike-off 16 is shown under the magazine 17 in Fig. 3. In this position the aggregate A made up of sand, cement, and crushed stone or cinder or whatever other material is desired flows into the feed drawer. This aggregate varies with the product.

In the next operation, shown in Fig. 4, the feed drawer 16 is pushed forward by the link 18 and lever 19. The plate 20 on the rear of the feed drawer passes under the magazine 17 and holds the contents of the magazine from dropping out. This is customary construction. At the same time the feed drawer goes forward the packing head 21 and the packing head guide 22 is swung forwardly and upwardly by the link 23 attached to the feed drawer. The feed drawer is now directly above the mold box 9 and the contents of the drawer are dropping into the mold. The mold box and pallet 2 rest on the block 24 above the magnetic vibrator 25. A mechanical vibrator can be used in place of a magnetic vibrator. As the aggregate A drops into the mold, the vibrator is set vibrating by means that will be hereinafter described. After the contents of the said drawer has been emptied into the mold box the vibrator continues for a definite length of time which can be changed for each particular mold box by a setting of the timer depending upon the aggregate being used and the amount of packing desired before the packing head comes down.

After the contents of the drawer have been emptied in accordance with the timing hereinafter described, the feed drawer is withdrawn as shown in Fig. 5 striking off the excess material, and the packing head is swung down and dropped upon the content of the molds as shown in this figure. The vibrator head 26 is then set into action and is only stopped when the packing head has tamped the block to the correct size as shown in Fig. 5, whereupon the switch contacts 27 come into contact and establish a circuit which stops the vibration when the mold has been raised to the point that its bottom line has cleared the bottom of the packer head. At this same time stripping lever 14 and stripper arm 15 raise the mold box and strip it off from the block B or blocks B as shown in Fig. 6. The packing head slide 28 is raised by the lever arm 29 which engages the pin 30 on the cap 31 on the end of the slide and raises the packing head about 1½ inches. The stripper arm 15 engages under the flange 32 on the mold box. In the next operation the pallet pusher 4 by means of angle bars 5 pushes the pallets including the concrete blocks forward and the blocks out of the machine. It will be understood that the mold box may be an elongated member that has a plurality of molds or mold cavities in it and, consequently, the one pallet may seat several finished blocks. The mold box also supports the core bars (not shown) which in turn support the cores (not shown) for each block. There may be one or more cores for each block, but inasmuch as these items are old and common in the art they are not illustrated. These core bars and cores are attached to the mold box which are shown in the Patent of Robert O. Davis and Noel E. Osborne, Patent No. 2,646,607, issued July 28, 1953.

Figure 2:
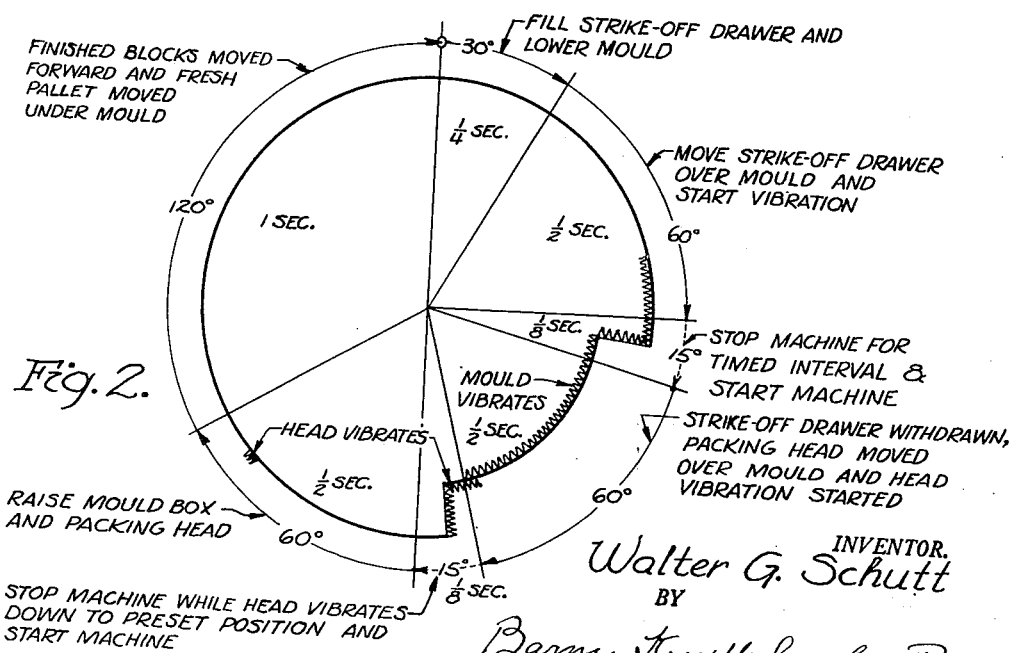
Fig. 2 is the timing diagram of the cycle of operations.
Figure 7:
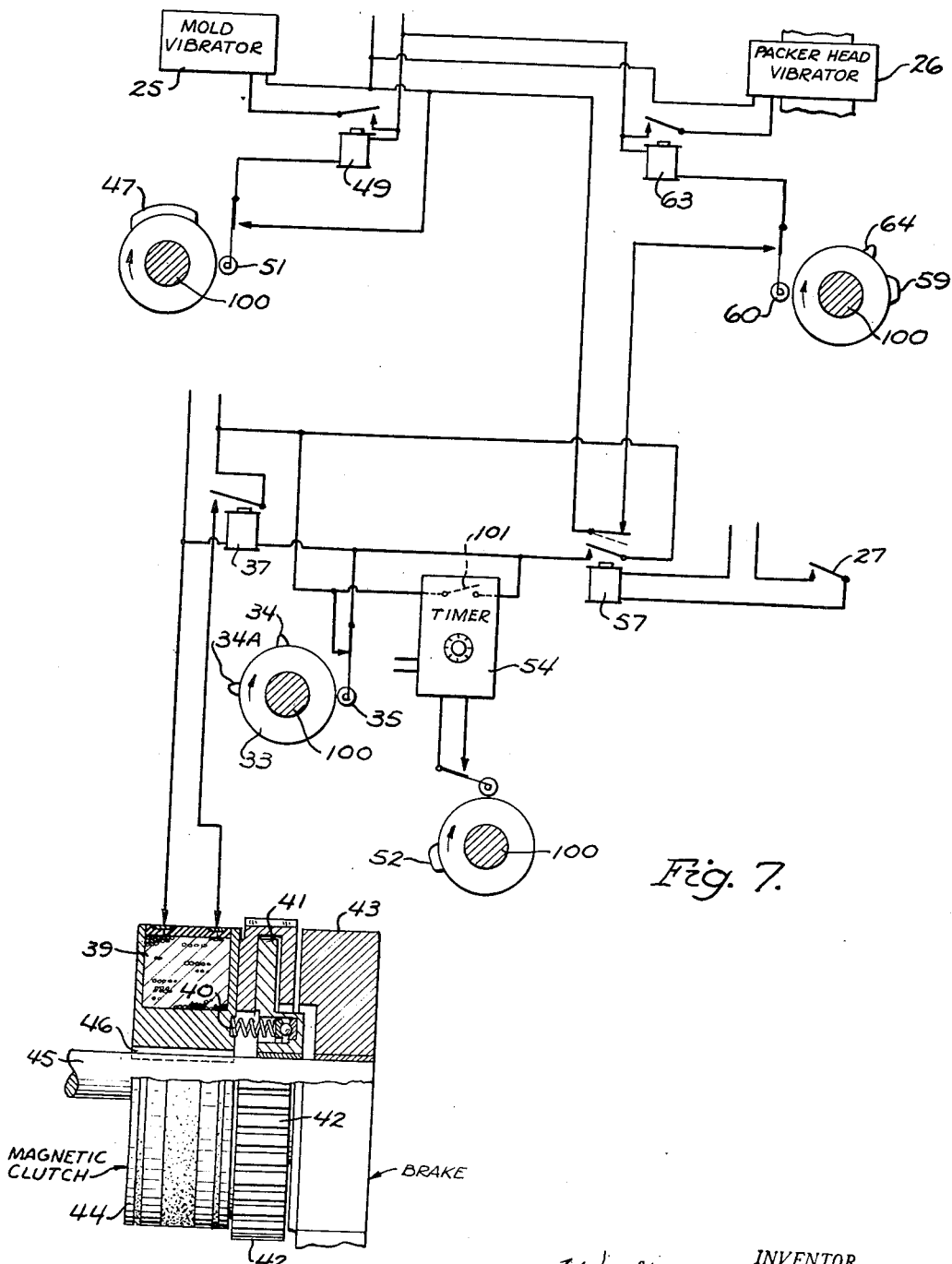
Fig. 7 is a wiring diagram for the timers and the stopping mechanism, the latter is shown in elevation and section.

Refer now to Fig. 2 which is a diagram of the cycle of operations and starting at the top of the circle. The strike-off drawer is full of material, since it is under the supply hopper. It will be seen that the first operation is to lower the mold onto an empty pallet already being in place below the mold. It will be seen that this takes 30 degrees of the cycle and ¼ of a second in time. The portions of the cycle and the timing in seconds is only illustration and obviously may be varied. The next movement is to move the strike-off drawer over the mold; this requires 60 degrees of cycle or ½ second of time. Thereupon the machine is stopped. This is effected by the cam 33 (see Fig. 7) which has a nub 34 that engages limit switch roller 35 opening this switch which in turn deenergizes the holding coil or contactor 37 causing it to open and de-energize the magnetic clutch coil 39. Springs 40 then shift the disc 41 carrying the driven gear 42 over against the stationary braking member 43, stopping the machine.

At approximately the same time, that nub 34 on cam 33 contacts limit switch roller 35, cam 47 on the common cam shaft 100 contacts limit switch roller 51, closing this limit switch and energizing the holding coil of contactor 49 thus closing the contactor energizing the mold vibrator 25 and starting mold vibration which continues as long as roller 51 rides cam 47 (so that it may be stopped and started by varying the shape of the cam).

At approximately the same time, that nub 34 contacts roller 35, cam 52 on cam shaft 100 contacts limit switch roller 53, closing this switch and energizing the timer 54. After the period for which the timer is set has expired, the timer 54 contacts 101 close energizing the holding coil of contactor 37, thus closing this contactor and reenergizing the magnetic clutch coil 39 which reattracts the disc 41 carrying gear 42 and starts the machine. The magnet 44 is keyed to drive shaft 45 by key 46.

Starting the machine withdraws the feed drawer 16 and swings the head into position over the full mold box and allows the head to drop down upon the material in the mold. Vibration of the mold may continue through this movement or may be interrupted during the movement and again started at completion of the movement.

The machine is stopped a second time as shown in the diagram Fig. 2 after the packing head has been dropped onto the mold contents. The stoppage is effected by cam nub 34A which contacts limit switch roller 35 opening this switch and thus de-energizing the magnetic clutch coil as already described in the first stopping of the machine.

At approximately the same time that nub 34A contacts roller 35, cam 59 on the cam shaft 100 contacts limit switch roller 60 closing this switch and energizing the holding coil of contactor 63 thus energizing packer head vibrator 26 and starting head vibration. Vibration of both head and mold continue.

When the material in the mold is forced down to proper block size the contacts 27 (Figs. 5 and 7) come together closing the circuit to contactor 57 energizing the holding coil which does two things. It opens the circuit to contactor 63 thus de-energizing the packer head vibrator and stopping head vibration and it closes the circuit to the holding coil of contactor 37, thus energizing the clutch coil and starting the machine. Mold vibration ceases when roller 51 runs off of cam 47, although by a slight change in the wiring, it may be stopped by contactor 57.

Contacts 27 (Fig. 5) are adjustable to regulate height of block.

The next segment of the cycle is a 60 degree segment and ½ second timing. Co-incidentally, the stripping mechanism raises the mold box and at the proper instant the packing head is lifted from the block.

Cam 64 (Fig. 7) is set so that just at the instant the head is lifted from contact with the blocks, the head is vibrated for a very short period to insure clean separation.

Referring to Fig. 2, 60 degrees in the cycle or ½ second is allotted for the raising of the mold box and packing head. In the final portion of the cycle 120 degrees or 1 second is allotted for the finished blocks to be shoved out of the machine as shown in Fig. 6 and a new pallet 2 to be shoved forward under the mold box. Only 15 degrees or ⅛ second of the cycle is allotted for stopping and starting the machine. This allotment is tolerance to take care of any over throw of the moving parts due to inability to stop the machine the instant the cams operate the switches. Of course, there has to be added to this ⅛ second timing at each of the vibration points in the cycle the stopping and starting, lag and actual dwell time allotted for increasing the vibration period. This, as already explained, depends so far as the mold vibration is concerned upon the type of the aggregate used, the type of unit being made and the amount of packing desired before the packing head is lowered upon the mold box. This may be a relatively short period or it may be a relatively long period depending upon conditions.

With continuous operating cycle machines of the prior art quite a large part of the cycle and of the timing had to be allotted to take care of the maximum time for vibration that would be required at any operation of the machine. Consequently, when a considerably less amount of time was required for vibration the machine had to be operated at the same slow pace in order to adapt itself for conditions where the machine was operating with a relatively long vibration period. Hence, in these prior art machines there is a considerable time wasted in the operation of each cycle in making blocks when short mold vibration periods are used. Hence, with a machine so operating the total production per hour or for the day is considerably slowed up compared with the production that could be obtained by my new method and new machine.

The same saving in time with my method and machine obtains in connection with the vibration period for the packing head. The machine cycle and the timing has had always to be controlled by the maximum time period that would be used in the packing head packing the concrete blocks down to the desired size. With my improved machine and method the wastage of time to take care of maximum vibration periods is obviated when the machnie is operated for shorter vibration periods. It will also be apparent that this new method and new machine permits an even more prolonged vibration period than might be within the capacity of a continuously operated machine, whose maximum capacity is not designed to take care of an abnormal vibration period.

It will be apparent from the above that a considerable speed up in the operation of the machine can be obtained by reason of my improvement and, consequently, production increased. This will result in a considerable labor saving per block and also considerable saving of capital investment per block produced, therefore, this makes for cheaper manufacture of these blocks or similar concrete products.

What I claim is:

1. A continuously cycling machine for molding concrete blocks or other products having in combination a frame, a pusher for pushing pallets from a stack to a molding position and at the same time pushing a pallet of the molded product out of the machine, a mold box, means for lowering and raising the mold box, a strike-off drawer, means for moving the strike-off drawer forward above the mold box and for withdrawing it to position for filling, a plate over which the strike-off drawer with its open bottom passes, a magazine for feeding the aggregate into the strike-off drawer when the drawer is below the open bottom magazine, the said drawer being provided with a rearwardly extending plate to seal the open bottom of the magazine when the strike-off drawer moves away from the magazine, vibrating means, a packer head, means for dropping the packer head upon the contents of the mold box and for raising the packer head, and means for operating the aforementioned elements in the following sequence: move an empty pallet into position and at the same time, move the pallet with the block out of the machine, lower the mold box, move the strike-off drawer forward over the mold box, stop the operating connections in the machine and cause the drawer to pause over the mold box for a determined length of time, vibrate the mold box for a determined length of time of which the determined pause is a part, start the operating connections of the machine again, move the strike-off drawer back under the magazine, stop the machine a second time for a determined period of vibration of the packer head determined by the descent of the packing head in the mold box, strip the block or product by moving the mold box upwardly, and raise the packing head.

2. A continuously cycling machine for molding concrete blocks or other products having in combination a frame, means for conveying pallets from a stack to a molding position and at the same time pushing a pallet of the molded product out of the machine, a mold box, means for lowering and raising the mold box, a strike-off drawer, means for moving the strike-off drawer forward above the mold box and for withdrawing it to position for filling, a plate over which the strike-off drawer with its open bottom passes, a magazine for feeding the aggregate into the strike-off drawer when the drawer is below the open bottom magazine, the said drawer being provided with a rearwardly extending plate to seal the open bottom of the magazine when the strike-off drawer moves away from the magazine, vibrating means, a packer head, means for dropping the packer head upon the contents of the mold box and for raising the packer head, and power operated means including a clutch and brake for operating the aforementioned elements in uniformly timed and repeated cycles and in the following sequence: move an empty pallet into position and at the same time move the pallet with the block out of the machine, lower the mold box, move the strike-off drawer forward over the mold box, stop the operating connections in the machine for a timed pause by disconnecting the clutch and applying the brake, vibrate the mold box for the timed pause, start the operating connections of the machine again, move the strike-off drawer back under the magazine, stop the machine a second time for a determined period of vibration of the packer head in which the period is ended and the machine is started by the descent of the packing head in the mold box which at a given level establishes an electric current, applies the clutch and releases the brake, strips the block or product by moving the mold box upwardly, and raises the packing head.

3. A machine for molding concrete blocks or other products having in combination a frame, a means for conveying pallets from a stack to a molding position and at the same time pushing a pallet of the molded product out of the machine, a mold box, means for lowering and raising the mold box, a strike-off drawer, means for moving the strike-off drawer forward above the mold box and for withdrawing it to position for filling, a plate over which the strike-off drawer with its open bottom passes, a magazine for feeding the aggregate into the strike-off drawer when the drawer is below the open bottom magazine, the said drawer being provided with a rearwardly extending plate to seal the open bottom of the magazine when the strike-off drawer moves away from the magazine, vibrating means, a packer head provided with electric switch contact members, means for dropping the packer head upon the contents of the mold box and for raising the packer head, and means including a spring released and electromagnetically engaged clutch and brake, electric circuits, switches, a rotating shaft with cams for operating the switches, solenoids and timer for operating the aforementioned elements in the following sequence: move an empty pallet into position and at the same time move the pallet with the block out of the machine, lower the mold box, move the strike-off drawer forward over the mold box, stop the operating connections in the machine by disconnecting the clutch and applying the brake, vibrate the mold box for a length of time determined by one of said cams, have the timer close switch, energize circuit and solenoid to close a second circuit with solenoid coil to engage magnetic clutch and disengage brake and start the machine again, move the strike-off drawer back under the magazine, stop the machine a second time for a determined period of vibration of the packer head determined by the descent of the packing head contact members into the mold box, said stoppage disconnecting the clutch and applying the brake, strip the block or product by moving the mold box upwardly, and raise the packing head.

4. A machine for molding concrete blocks or other products having in combination a frame, means for conveying pallets from a stack to a molding position and at the same time pushing a pallet of the molded product out of the machine, a mold box, means for lowering and raising the mold box, a strike-off drawer, means for moving the strike-off drawer forward above the mold box and for withdrawing it to position for filling, a plate over which the strike-off drawer with its open bottom passes, a magazine for feeding the aggregate into the strike-off drawer when the drawer is below the open bottom magazine, the said drawer being provided with a rearwardly extending plate to seal the open bottom of the magazine when the strike-off drawer moves away from the magazine, vibrating means, a packer head provided with electric contacts, power operated means for dropping the packer head upon the contents of the mold box and for raising the packer head, and means including rotating cams, electric motors, switches, electric circuits, mechanical elements and a timer, all coordinated, for operating the aforementioned elements in the following sequence: move an empty pallet into position and at the same time move the pallet with the block out of the machine, lower the mold box, move the strike-off drawer forward over the mold box, stop the machine by a cam opening a switch, a rotating cam closing a circuit to a motor to vibrate the mold box for a determined length of time, of which time the machine dwell is a calculated part to enable the other movements of the machine to be sped up, start the operating connections of the machine again by the timer closing a circuit after an adjustably predetermined period, move the strike-off drawer back under the magazine, stop the machine a second time for a determined period of vibration determined by the height of the block and the descent of the packer head to the determined line of the top of the block whereupon the packer head contact members close an electric circuit to restart the machine, strip the block or product by moving the mold box upwardly and raise the packing head.

5. The combination claimed in claim 4 including an electromagnetically and spring operated clutch and a brake, in which the machine each time is stopped by a rotating cam tripping a switch to break a circuit to the magnetic clutch for holding the clutch parts engaged and free from contact with the brake, and in which, at the end of the stoppage periods, the timer and the packer head contacts reestablished circuits to the magnetic clutch to disengage it from the brake and reestablish the clutch driving connections to drive the machine parts.

6. A continuously cycling concrete block forming machine having the elements, including a mold box and the power connections for automatically producing and ejecting blocks at each cycle, and means for completely stopping the machine during operations, once during the vibration of the mold contents during the mold feeding operation, an automatic timer capable of being set to time the stoppage in accord with the type of concrete aggregate at the time being used in the machine, and said means stopping the machine a second time during the packing of the mold and this stoppage being measured by the descent of the packing head including a contact switch when the contents of the mold have been packed to the correct size closing and thereby starting the machine again.

7. The method of operating a continuously cycling automatic concrete block machine, which machine has a hopper, a mold which is raised and lowered, vibrating means for elements in contact with the contents of the mold, means for feeding pallets below the mold, the mold then being lowered onto the pallet, the means conveying away the pallet with the molded block when the mold is raised, a strike-off drawer operating on a table between the lower open end of the hopper and at the proper time conveying a drawerful of aggregate across the table to the open top of the mold after the mold is lowered onto the pallet, a packing head which is lowered onto the contents of the mold when the feed drawer is withdrawn, the said method comprising running the machine in continuously cycling operations in which there is no pause in passing from one cycle to the next cycle but stopping all the parts of the machine except the vibrating means during two separate vibrating operations, one while the feed drawer is dropping the aggregate into the mold and the other which the packing head is on the contents of the mold, and timing the vibrating periods and the two dwells to suit the aggregate being used in the first dwell and to get the correct height of the block in the second vibration, whereby the speed of the shifting operations of the machine can be higher and the production capacity of the machine per unit of time increased.

References Cited in the file of this patent

UNITED STATES PATENTS

| Number | Name | Date |
|---|---|---|
| 777,086 | Emery | Dec. 13, 1904 |
| 1,182,862 | Stehm | May 9, 1916 |
| 1,258,237 | Monroe | Mar. 5, 1918 |
| 1,921,003 | Romie | Aug. 8, 1933 |
| 2,054,476 | Derry et al. | Sept. 15, 1936 |
| 2,269,995 | Olsen | Jan. 13, 1942 |
| 2,308,132 | Wellnitz | Jan. 12, 1943 |
| 2,360,122 | Gelbman | Oct. 10, 1944 |
| 2,366,780 | Gelbman | Jan. 9, 1945 |
| 2,400,631 | Darden | May 21, 1946 |
| 2,446,061 | Reed | July 27, 1948 |